US008976684B2

(12) United States Patent
Larsen

(10) Patent No.: US 8,976,684 B2
(45) Date of Patent: Mar. 10, 2015

(54) INTELLIGENT VIDEO, DATA STREAMING AND ACCESS TO DISTRIBUTED RESOURCES IN A WIRELESS NETWORK

(75) Inventor: James David Larsen, Woodinville, WA (US)

(73) Assignee: Conversant Intellectual Property Management Inc., Ottawa, Ontario (CA)

(*) Notice: Subject to any disclaimer, the term of this patent is extended or adjusted under 35 U.S.C. 154(b) by 1729 days.

(21) Appl. No.: 12/094,989

(22) PCT Filed: Nov. 27, 2006

(86) PCT No.: PCT/IB2006/003348
§ 371 (c)(1),
(2), (4) Date: May 24, 2008

(87) PCT Pub. No.: WO2007/060536
PCT Pub. Date: May 31, 2007

(65) Prior Publication Data
US 2008/0261605 A1    Oct. 23, 2008

Related U.S. Application Data

(60) Provisional application No. 60/740,064, filed on Nov. 28, 2005.

(51) Int. Cl.
*H04L 12/26* (2006.01)
*H04W 4/00* (2009.01)
(Continued)

(52) U.S. Cl.
CPC ............... *H04L 29/06* (2013.01); *H04L 45/26* (2013.01); *H04W 8/005* (2013.01)
USPC ............................ 370/252; 370/329; 370/338

(58) Field of Classification Search
CPC ........ H04L 29/06; H04L 45/26; H04W 8/005
USPC .......................................... 370/252, 329, 338
See application file for complete search history.

(56) References Cited

U.S. PATENT DOCUMENTS 5,987,011 A * 11/1999 Toh ............................... 370/255
6,097,703 A    8/2000 Larsen et al.
(Continued)

FOREIGN PATENT DOCUMENTS

| WO | WO 98/56140 A | 12/1998 |
|---|---|---|
| WO | 2005/107218 | 11/2005 |
| WO | WO 2005/107218 A | 11/2005 |

OTHER PUBLICATIONS

Mischke J et al., "Peer to Peer and distributed search in fixed mobile environments", Proceedings of the 37th Hawaii International Conference on System Sciences—2004, Jan. 2004, pp. 284-293, IEEE, Piscataway, NJ, USA.
(Continued)

*Primary Examiner* — Steven H Nguyen
(74) *Attorney, Agent, or Firm* — Shin Hung; Borden Ladner Gervais LLP

(57) ABSTRACT

The invention provides a method of operating a network which comprises a plurality of stations each able to transmit and receive data so that the network can transmit data directly, or indirectly via one or more intermediate stations, between a requesting station and potential resource providing stations. The method comprises monitoring, at each station, the activity and/or resources of other stations on the network to establish the availability of resources at the other stations, and transmitting, from a requesting station requiring a specified resource, resource request probe signals identifying the specified resource. The resource may be data, connectivity, memory/storage, or another resource. At each station receiving the resource request probe signals, the availability of the specified resource or a portion thereof is determined, and hence whether said station is a potential resource providing station. If such a potential resource providing station has the specified resource or a portion thereof, response data is transmitted directly, or indirectly via one or more intermediate stations, to the requesting station indicating the availability of the specified resource or portion thereof to the requesting station. The requesting station is then given access to the specified resource or portion thereof from at least one resource providing station selected from one or more potential resource providing stations. The invention extends to a network for implementing the method.

28 Claims, 3 Drawing Sheets

(51) Int. Cl.
*H04L 29/06* (2006.01)
*H04L 12/721* (2013.01)
*H04W 8/00* (2009.01)

(56) References Cited

U.S. PATENT DOCUMENTS

| | | | |
|---|---|---|---|
| 6,473,617 B1 | 10/2002 | Larsen et al. | |
| 6,785,510 B2 | 8/2004 | Larsen | |
| 6,810,428 B1 | 10/2004 | Larsen et al. | |
| 6,965,568 B1 | 11/2005 | Larsen | |
| 7,065,579 B2 * | 6/2006 | Traversat et al. | 709/230 |
| 7,068,600 B2 * | 6/2006 | Cain | 370/230.1 |
| 7,450,521 B2 * | 11/2008 | Park et al. | 370/252 |
| 7,590,068 B2 | 9/2009 | Larsen et al. | |
| 7,656,879 B2 * | 2/2010 | Riedel et al. | 370/395.21 |
| 7,693,093 B2 * | 4/2010 | Riedel et al. | 370/260 |
| 7,719,972 B2 * | 5/2010 | Yuan et al. | 370/230 |
| 2002/0009079 A1 | 1/2002 | Jungck | |
| 2003/0033394 A1 | 2/2003 | Stine | |
| 2003/0202476 A1 * | 10/2003 | Billhartz et al. | 370/236 |
| 2004/0246900 A1 * | 12/2004 | Zhang et al. | 370/238 |
| 2004/0246901 A1 * | 12/2004 | Zhang et al. | 370/238 |
| 2004/0246904 A1 * | 12/2004 | Zhang et al. | 370/252 |
| 2005/0063356 A1 | 3/2005 | Larsen et al. | |
| 2005/0135242 A1 | 6/2005 | Larsen et al. | |
| 2005/0135270 A1 * | 6/2005 | Larsen et al. | 370/254 |
| 2006/0133272 A1 * | 6/2006 | Yuan et al. | 370/230 |
| 2007/0002821 A1 * | 1/2007 | Carlson et al. | 370/349 |
| 2007/0280262 A1 | 12/2007 | Larsen et al. | |
| 2009/0133105 A1 | 5/2009 | Larsen | |

OTHER PUBLICATIONS

Mao S. et. al., "MRTP: A Multi-Flow Realtime Transport Protocol for Ad Hoc Networks", Vehicular Technology Conference, Oct. 2003, pp. 2629-2634, IEEE, Piscataway, NJ, USA.

* cited by examiner

INTELLIGENT VIDEO, DATA STREAMING AND ACCESS TO DISTRIBUTED RESOURCES IN A WIRELESS NETWORK

BACKGROUND OF THE INVENTION

This invention relates to a method of operating a network to cooperatively identify and access resources distributed amongst neighbor stations in connectivity with one another, in order to enable readily available resources on the network to be efficiently directed to users requiring access to the resources.

For the purposes of this specification, such a network will be referred to as an Opportunity Driven Multiple Access (ODMA) network of the general kind described in International patent applications nos. WO 96/19887 and WO 98/56140.

It is an object of the invention to provide a mechanism in which user stations on a network may source relevant information, and benefit from any underutilized resources available, from the other stations on the network by virtue of the distributed nature of the network topology. The mechanism provided exploits the inherent neighbor gathering techniques that are utilized in the ODMA network communication processes.

SUMMARY OF THE INVENTION

According to the invention there is provided a method of operating a network comprising a plurality of stations each able to transmit and receive data so that the network can transmit data directly, or indirectly via one or more intermediate stations, between a requesting station and potential resource providing stations, the method comprising:

- monitoring, at each station, the activity and/or resources of other stations on the network to establish the availability of resources at the other stations;
- transmitting, from a requesting station requiring a specified resource, resource request probe signals identifying the specified resource;
- determining, at each station receiving the resource request probe signals, the availability at said station of the specified resource or a portion thereof and hence whether said station is a potential resource providing station;
- transmitting, from a potential resource providing station having the specified resource or a portion thereof, response data directly, or indirectly via one or more intermediate stations, to the requesting station indicating the availability of the specified resource or portion thereof to the requesting station; and
- receiving, at the requesting station, access to the specified resource or portion thereof from at least one resource providing station selected from one or more potential resource providing stations.

The specified resource may be, for example, one or more of data, connectivity within the network or to an external network or device, memory/storage, data processing capability, display capability, and data relating to the maintenance of information on the location of stations, the history of resource requests and fulfillment of such requests, and the availability of resources.

In the case of data, the data can be one or more of video, audio, text, image or other data.

Stations in the network may receive the resource request probe signals directly from the requesting station, or indirectly via one or more intermediate stations.

In the latter case, each station receiving the resource request probe signals indirectly may monitor the number of transmission hops via intermediate stations between the requesting station and itself and responds only to probe signals received via fewer than a predetermined number of intermediate stations or transmission hops, or if the cumulative cost of transmission to the requesting station is less than a predetermined value.

Preferably, where the resource request probe signals and response data are transmitted via one or more intermediate stations, each transmission is made opportunistically based on one or more criteria.

For example, the stations of the network may monitor the cumulative power required to reach another station, thereby defining a cost gradient to the other stations, with stations using the cost gradient in the selection criteria used to determine an optimal route through the network between a resource providing station and a requesting station.

The criteria may include the cost of each hop between stations, or the cumulative cost of message transmission between stations having connectivity with one another, directly or via intermediate stations.

The specified resource may be obtained from one or more resource providing stations, which resource providing stations are selected according to one or more criteria, including the extent of the specified resource available at the resource providing station, the data processing capacity of the resource providing station, the data storage capacity of the resource providing station, the distance or number of hops via intermediate stations between the resource providing station and the requesting station, the quality of communication between immediate stations and/or the cumulative connectivity cost between the resource providing station and the requesting station, availability of power at the resource providing station and/or intermediate stations, the existence of other demands on the resource providing station, and the amount of time available within which the specified resource can be supplied timeously to the requesting station.

The choice of resource providing station may be made opportunistically at the moment of distribution of the specified resource.

A plurality of stations may cooperate actively in making the specified resource available to the requesting station.

The specified resource or portion thereof may be transferred between one or more resource providing stations and one or more intermediate stations, with the intermediate stations taking over the role of the initial resource providing stations, as the requesting station moves relative to the other stations, for example.

The source or intermediate stations may predict the route of a requesting station that is moving and steer the specified resource to further intermediate stations expected to be located opportunely to make the resource available to the requesting station. Typically, this will occur where multiple sources of the specified resource are utilized and/or buffered for piecemeal distribution to the source station.

The specified resource may be actively distributed from one or more resource providing stations to further stations capable of acting as intermediate or resource providing stations, to provide redundancy in the event of a loss or reduced quality of connectivity between stations, or a loss or reduction of quality of resources or functionality at stations, or other events likely to limit availability of the specified resource to the requesting station.

Where several requesting stations request substantially the same data from one or more potential source stations at substantially the same time, a source station may transmit the data to one or more of the requesting stations, together with an additional request that this requesting station forward the data to other requesting stations (rather than the original source station transmitting the data to each of the requesting stations itself). This is especially relevant where other requesting stations have good connectivity with the initial requesting station, thereby enabling the other requesting stations to source data from stations that are substantially in the same locale.

Stations in the network may advertise their availability as potential resource providing stations to other stations in the network, and transmit probe signals to other stations including data indicating the nature and extent of the resources available.

Stations receiving such probe signals from potential resource providing stations may determine the desirability of the advertised resources based on the probe signals and data received therefrom, and request part or all of the resource available.

Profile and location information may be maintained at neighbor stations indicating potential interest in at least a portion of the resources being advertised to potential requesting stations.

Stations in the network may monitor network transmissions for irregularities indicating undesirable activity, and transmit notice of such activity to other stations and/or to a central authority.

The method may include transmitting a plurality of different data blocks to a plurality of stations from a resource providing station, the data blocks together comprising a complete data set, and a requesting station requiring the complete data set obtaining the data blocks from one or more resource providing stations.

The requesting station may initially select a resource providing station able to supply a relatively poor quality resource, and subsequently selects one or more alternative resource providing stations able to continue supplying the resource at a higher quality level.

The method may include maintaining a record of resources requested and/or accessed at a central server, requesting stations being able to access the record to obtain initial information about the availability and/or location of such resources.

Stations in the network may monitor transmissions of other stations to detect transmissions requiring a decryption key or having predetermined content, a station detecting such a transmission declining to transmit said transmission onward or notifying a central authority if it fails to meet one or more predetermined criteria.

In one embodiment, at least one station in the network has a monitoring or surveillance function, said at least one station generating, in response to an alarm condition, a request to other stations to prioritize the capture, transmission and/or storage of data relating to an event associated with the alarm condition.

The other stations may respond to the request by storing data relating to the alarm condition, including data captured before and/or after the occurrence of the alarm condition.

Further according to the invention there is provided a communication network comprising a plurality of stations each able to transmit and receive data so that the network can transmit data directly, or indirectly via one or more intermediate stations, between a requesting station and potential resource providing stations, each station being arranged to:

monitor the activity of other stations on the network to establish the availability of intermediate stations for onward transmission of data between the requesting station and the potential resource providing stations;

transmit, when acting as a requesting station requiring a specified resource, resource request probe signals identifying the specified resource;

determine, when acting as a station receiving the resource request probe signals, the availability at said station of the specified resource or a portion thereof and hence whether said station is a potential resource providing station;

transmit, when determined to be a potential resource providing station having the specified resource or a portion thereof, response data directly, or indirectly via one or more intermediate stations, to the requesting station indicating the availability of the specified resource or portion thereof to the requesting station; and receive, when acting as the requesting station, access to the specified resource or portion thereof from at least one resource providing station selected from one or more potential resource providing stations.

Embodiments of the invention are described in detail in the following passages of the specification, which refer to the accompanying drawings. The drawings, however, are merely illustrative of how the invention might be put into effect, so that the specific form and arrangement of the features shown is not to be understood as limiting on the invention.

DESCRIPTION OF EMBODIMENTS

Figure 1:
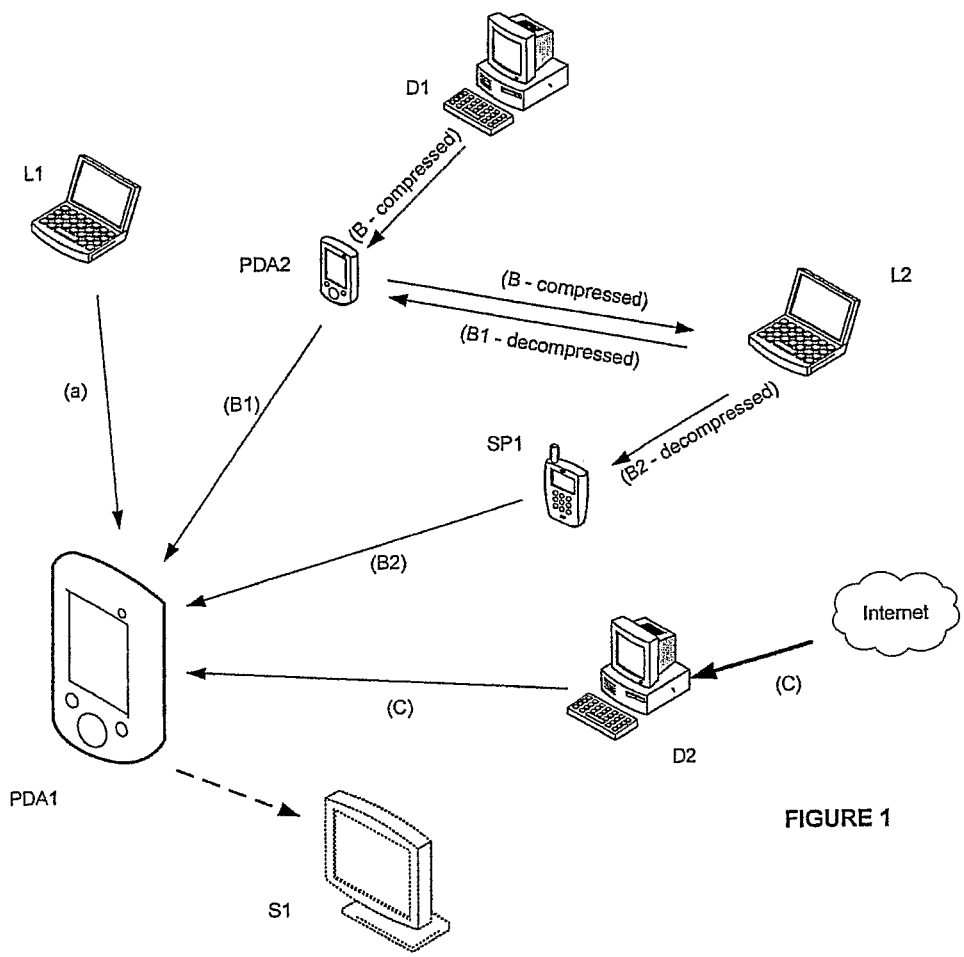
FIG. 1 shows a simplified connectivity diagram illustrating the manner in which data sub-components may be sourced from the network.

The present invention relates to the use of an Opportunity Driven Multiple Access (ODMA) network, of the general kind described in WO 96/19887 and WO 98/56140, to transfer resources from resource providing stations to resource requesting stations.

It will be appreciated that in such a network environment, users connected to the network will, between them, likely retain a considerable quantity of aggregate knowledge and data on each of their network stations. In addition, these stations will likely have certain resources available that might exceed their own particular needs at any given time.

The ODMA-over-wireless methodology is used in a communication network which has a number of wireless stations which are able to transmit data to and receive data from one another. The methodology comprises defining a first probing channel for the transmission of first, broadcast probe signals to other stations. Other stations which receive the first probe signals (also referred to as "slow probes") from a probing station indicate to the probing station their availability as destination or intermediate stations. A neighbor table comprising details of, and connectivity data relating to, these other available stations is maintained at each of the stations.

In an ODMA network utilizing a wireless medium, when there are a number of stations in close proximity they will end up probing at higher data rates and lower transmit powers. Listening stations will occasionally respond to stations that are probing at the lower data rates, or that do not have enough neighbors, to help any lonely (distant) stations (also referred to as "lonely neighbors") that cannot use the higher data rates or do not have sufficient neighbors. Stations will only use the lower data rates when they are lonely and cannot find sufficient neighbors at the higher data rates and at maximum power.

ODMA networks utilise two kinds of probing processes, "slow probing" and "fast probing". The slow probing process is used by each network station to gather neighbors, while the fast probing process is used to construct gradients between originating and destination stations.

Each station will transmit slow "neighbour gathering" probe signals at regular intervals (determined by a Slow Probe Timer) trying to find other stations. Stations indicate in their slow probes that they are able to detect other stations probing and in that way stations will vary their probe power until a certain predetermined number of stations indicate they are able to detect the probes. If a station never acquires the required number of neighbors it will remain at the lowest data rate and maximum transmit power.

Each station will randomly vary the Slow Probe Timer slightly between slow probe signal transmissions to avoid collision with other stations. Should any station start receiving another station's transmission, it will reload the Slow Probe Timer with a new interval.

In a wireless network of mobile stations the stations are constantly moving, and as such the number of neighbors will constantly be changing. If the number of neighbors exceeds the required number, a station will start to increase its data rate on the probing channel. It will continue to increase its data rate until it no longer exceeds the required number of neighbors. If it reaches the maximum data rate it will start to drop its slow probe transmit power by small increments until it either reaches the minimum transmit power, or no longer exceeds the required number of neighbors.

When a station replies to another station's slow probe on a Probing Channel it will limit the length of its data packet to the Slow Probe Timer interval. This is to avoid other stations probing over its reply. If the station that is replying has more data to send than will fit in a small packet it will indicate in the header of the packet that the other station must move to a specific Data Channel.

There can be a number of Data Channels defined for each Probing Channel. The station that is requesting the change will randomly select one of the available Data Channels. When the other station receives the request it will immediately change to that Data Channel, where the two stations will continue to communicate until neither of them have any data to send, or if the maximum time for remaining on the Data Channel expires (set by a Data Timer). Alternative data transport protocols could also be used.

When a station changes to the Data Channel it loads the Data Timer. It will remain on the Data Channel for as long as the Data Timer will allow. When the Data Timer expires the stations will revert back to the Probing Channel and start probing again.

The slow probing process consists of three basic functions:
1. Neighbor collection
2. Power learning
3. Ramping of neighbors The process of neighbor collection consists of a station probing at increased levels of power until neighboring stations indicate in their own probes that they are detecting the probes of the first station. The power of the probe is increased until a predetermined number of neighbors indicate that they are detecting the probes.

All probing stations increase and decrease their probe power until all stations have collected a predetermined number of neighbors. This process consists of increasing and decreasing the power level of probes and indicating in probes which other stations' probes are heard. In this way all stations can learn what power level they require to reach various neighbors.

Each time a station probes it indicates its transmit power and noise floor and which stations it has as neighbors. Every time a station hears another station probe it calculates from the probe the path loss and power required to reach the station from the path loss and the noise floor of that station. The path loss to the neighbor and the power required to reach the neighbor are stored in the neighbor table kept at each station. If a neighbor is no longer heard then the path loss and power level required to reach the station are increased or "ramped" in the table until a certain level is reached at which point the neighbor is removed from the neighbor table.

If a station has a message (or other data) to transmit to a station that is not one of its neighbors, for example, a distant station across the network, it begins to transmit fast probe signals (or gradient gathering probe signals) to develop information on how to reach that station. The information is called a gradient and is an indication of the cumulative cost to reach a destination station. When a station starts to fast probe it indicates that it is looking for a destination and neighbors hearing the fast probe will themselves fast probe until the destination station hears the fast probes of its neighbors. The gradient is then built through adding cumulative cost until the gradient reaches the source, and the source can commence to send messages to neighbors using the information developed in the gradients to destination, which in turn can send them to their neighbors until the destination is reached.

Each station keeps a record of the (cumulative cost) gradients to each destination of each of its neighbors, and its own gradient to the destination. In standard ODMA communications, each station only passes messages to stations with a lower cumulative cost to destination. A station can pass a message to any of its neighbors with a lower gradient to destination. Neighbor gathering via slow probing and gradient generation via fast probing allow a station to develop a number of choices of stations with lower cost to any destination that can send messages to such destinations. The neighbors are maintained all the time via slow probing and gradients are only developed on a needs basis when messages/data needs to be sent to stations that are not neighbors.

Each wireless station uses the slow probing process to identify and obtain information from the station's neighbors. A station is considered a "neighbor" in this sense if it has been heard to transmit a neighbor gathering probe message, and details of the neighboring stations identified will be maintained in each station's neighbor table.

If an identified neighbor has itself transmitted a neighbor gathering probe message that is received by a particular station, and the probe contains information of the particular station's own identifier, then the neighbor is flagged as a "detecting neighbor" in the neighbor table. Typically each station will adapt its neighbor gathering techniques (generally by increasing data transmission rates and by powering down the strength of the probe signals sent out) to maintain approximately 10 detecting neighbors. Of these, a predetermined number of the neighbors with the lowest path loss are flagged as "close neighbors" (for example, five stations). The information obtained from close neighbors may be treated differently or preferentially and the techniques used to transmit the information may also be adapted depending on the neighbors.

If a station is unable to acquire the minimum number of close neighbors when it is transmitting on full probe power, it is referred to as a "lonely neighbor". Other stations that have acquired the required number of close neighbors that can detect the lonely neighbor transmissions will let the lonely neighbor know that they are detected, and may provide additional information to the lonely neighbor.

When not probing or sending other messages, each station is listening for the probes of the other stations. When heard, the receiving station can use the transmit power information provided in the probe to establish the path loss to the station. As each station is constantly identifying the close neighbors with the lowest path loss, these neighbors are likely to be either in direct line of sight, or have the best signal with least interference. Even stations merely able to listen will be in relatively good connectivity with a probing station in a fully operational network with many stations, as stations sending probes will likely have powered down their transmission levels in order to minimize their number of neighbors. In other words, neighbors are typically chosen for the quality of connectivity. Lonely neighbors are the exception, but will be recognized by the stations (hearing their full power transmissions and determining that they have less than the required number of collected neighbors) and assisted.

The ODMA methodology, particularly with regard to the use of neighbor tables and gradient tables, is described in detail in WO 2005/062528 entitled Probing Method for a Multi-Station Network, In an ODMA network, the ongoing accumulation of information relating to the needs and connectivity resources of neighbors is central to the efficient operation of the network. It should also be evident, that the greater the number of stations participating on the network, the greater will be the information and resources available. For example, an originating station might typically maintain neighbor tables and gather connectivity information in respect of 10 neighbors. If each of these neighbors in turn has similar information on 10 neighbors, then theoretically (ignoring the fact that there may be overlaps in neighbors gathered) the originating station may have access to the resources of 100 stations. Ten of the stations will be one communication "hop" away, while the remainder of the stations will be no more than two hops away. Consequently, at least in theory, 10 billion user stations would be available within 10 hops, if there were sufficient stations on the network.

It should be evident that the aggregate information and resources readily possessed by the network stations is considerable. The information held by any one station may or may not be complete for a particular purpose, but it is highly probable that most, if not all, of the information will adequately fulfill the requisition needs of other users through access to these aggregated pieces from multiple stations. The consequence of this, for present purposes, is that the need for user access to centralized databases is considerably mitigated, as in the vast majority of situations the information will be accessible from the distributed information already available through the other stations on the network itself.

However, in order to provide access to this data and these resource opportunities, it is necessary to provide a mechanism that will enable the required information to be identified and transmitted to the requesting station. In an ODMA network this is considerably less complicated than may initially have been envisaged when contemplating potential solutions for the mechanism, due to the ongoing neighbor gathering processes inherently utilized in the system.

In order to illustrate the invention, a video streaming embodiment of the invention is first described at a conceptual level. For example, a requesting station may wish to obtain video data in the form of television programs, films or movies, or as news clips and documentaries, and the like. Rather than directly accessing a central location (which would be the on-line equivalent of visiting a video rental shop), the user station can enquire from its neighbors whether they already have specified video content or whether they are aware (from their maintained records) of any of their neighbors that have the content (akin to asking next door neighbors whether they have visited the video store and rented the desired movie).

These neighbors may already have some or all of the relevant information, or have information regarding availability of the requested data. If the neighbor stations are not in a position to assist immediately, they can then enquire from their own neighbors, which in turn can enquire from their neighbors as necessary. Ultimately the potential availability of the required data will be reported back to the requesting station. The initial request made could have been broadly defined (for example, general news, or movies in a particular genre) or specifically stated in respect of all or a part of a particular program or movie. In this manner it is possible collectively to determine what is available. Stations in the network could maintain a directory of available information and resources in their neighbor tables that can be accessed by and/or provided to requesting or enquiring stations; or, alternatively, desktop search engines could be utilized at each station when required.

Users could define a user specific profile relating to the nature of the data the user is interested in or may be interested in. This profile could be shared and recorded with neighbors so that these neighbors could look out for certain data and alert the user to the availability of potentially interesting and useful items. For example, the profile could specify that the user wants access to information relating to all movies made by a certain director, and that the user has a general interest in old black and white musicals. Furthermore, the profile might specify the number of hops from the profiled station, or define other appropriate criteria, that neighboring stations will use to determine their investigations. It will be seen that this principle will also apply to potentially useful available resources as well.

By way of further illustration, if a news item is requested, each station will look around amongst the neighbors for parts of the news item and, in particular, for the initial part of the item. Stations that have already obtained access to the item will potentially have some or all of this data readily available in their temporary memory caches, or this information may have even been deliberately stored for some purpose. This data could then indeed be distributed to other stations on the network having larger memory buffers or on other data storage that may be available (either temporarily, or provided for this specific purpose).

As the station's neighbors would be aware (from information derived and shared through the probe signals being transmitted between the stations) that a station is attempting to make information available to the requesting station, and as they additionally would know the resource limitations of the unit being accessed and of the other stations assisting the unit, the neighbors could suggest additional neighbors that could assist; that may have larger memory buffers or data processing capabilities available, for example. The neighbors can then assist the requesting station by seeking the subsequent portions of the requested item and investigating the use of other possible resources that may be available—and if necessary any of these assisting stations can either hold the data, if the requesting station does not have sufficient memory, or can redistribute the data to units with more capacity. In this manner, stations can forward the information (using ODMA routing techniques) on to the requesting station when it is required, thereby gradually "spoon-feeding" information as needed in a piecemeal fashion.

In the event that several requesting stations request substantially the same data from one or more potential source stations at substantially the same time, a source station need not send the data to each and every requesting station itself. Instead, it may transmit the data or a portion thereof to one or more of the requesting stations; together with a request that the data be forwarded to other requesting stations. This is especially relevant where other requesting stations are in good connectivity with the initial (successful) requesting station that received the data. In this manner, subsequent requests for data will be answered by stations with the data that are substantially in the same locale as the requesting station(s), or which are in conditions of particularly good connectivity. The same principle applies to requests for other from other resources as is described below.

Again, as each station retains information regarding its neighbors and their neighbors (and possibly beyond), the task of spoon-feeding can be passed along to another station(s) that may be better suited to the task. This may arise by virtue of the connectivity between stations, or due to the resources used by any station, or alternatively the requesting station may have moved relative to the other stations, or the required data and/or resource needs may have changed as a result of the information required or offered. In this manner, the neighboring stations are essentially advertising their potential data throughput and other capabilities, and the stations best placed to perform the spoon-feeding can pass the task on to other well placed stations that become better equipped to undertake the task. This is especially relevant where data is banked up from multiple sources or multiple resources are utilized. This concept will be illustrated in more detail below.

Additionally, the neighbors could perform certain functions on behalf of other stations. For example, a station could access and download highly compressed data and a receiving station or other stations could then decompress this data on behalf of other stations prior to distribution. Indeed, a station might redistribute certain functions to neighbors with greater resources to carry out the function, such as the decompression referred to above. It should be appreciated that no single neighbor need undertake any of these steps alone, but may only be required to take action in respect of certain of the packets of information that together comprise the aggregated whole. In this manner, the available resources of the network are optimized, with the best placed stations undertaking the tasks, and consequently the network is operated as efficiently as possible.

This process is illustrated in the simplified connectivity diagram of FIG. 1, in which a requesting station comprising a personal digital assistant device (PDA1) seeks data from the network. (Note that the typical multi-hop opportunistic paths of connectivity between neighbor stations are not illustrated in the drawing). Through the network of neighbors, pieces of the required data are located. A laptop computer (L1) is identified as holding the first pieces of the data required (a), and this is transmitted to the requesting station PDA1.

It should be appreciated that the initial pieces may deliberately be of a lower quality, in order to utilize fewer resources (in terms of memory, processing power and transmission throughput requirements, etc) than the maximum quality available. This would enable more copies of the initial piece of the data to be stored in more places, thereby making the data easy to locate and readily available. This is similar to the concept of providing thumbnail pictures, or lower resolution pictures, or sound bites or movie preview clips, on a website, and providing the facility to download an improved version if required. If appropriate, the improved version could potentially be provided at a higher cost to the user, as the resources utilized by the network are more extensive and the data may have to be located from a less accessible source. This limits network overhead as subsequent materials may not even be required if the user does not wish to proceed.

In the illustrated example of FIG. 1, the user of the requesting station PDA1 user chooses to obtain the continued data streaming at a higher quality, perhaps having watched the preview of a movie. Suitable subsequent portions (but not all the portions) of the higher quality data (B) are located at a neighbor station comprising a desktop computer (D1). However, due to the higher quality and consequent increased amount of data, the data is compressed (and may possibly be encrypted). Consequently, although a second neighbor station comprising a PDA unit (PDA2) is well equipped to transmit the throughput required of the compressed data stream, it has relatively weak processing power. Therefore, the compressed data is routed to a neighbor station comprising a laptop computer (L2) known amongst the neighbors to have greater (and available) processing power to handle this task. (In any event, had the station PDA1 possessed substantial processing power, it would possibly not have the software functionality to undertake the decompression itself). As the quantity of data increases substantially after decompression, the station PDA2 is less able to transmit all the data, so some of the data (a potion B1) is routed to the station PDA2 and some (B2) to a smart phone station (SP1) for onward transmission to the requesting station PDA1.

The final portion of the data (C) is not readily accessible amongst the neighbors (for example, perhaps station PDA1 requested a less frequently chosen director's cut of a film). Using the methodologies employed in International patent application no. PCT/IB2006/001274 entitled Multi-Medium Wide Area Communication Network, filed 16 May 2006, the content of which is incorporated herein by reference, a neighbor station comprising a desktop computer (D2) with access to the Internet (in this example) is successful in locating the data (C) from a website or from some centralized database, which is routed to the station PDA1. It will be appreciated that this information need not have been accessed from the Internet, but may have been sourced form elsewhere amongst the neighbors or from any central database located on or accessible through the wireless network.

The neighbors of the station PDA1 are also aware of the resources of the unit, so it is possible, given the PDA limitations, that the availability of an unused screen or monitor (S1), with improved resolution, could be communicated to the station PDA1 and used to improve the viewers viewing experience. For example, this could be an ODMA enabled television in a hotel room, or a computer available to hotel residents, or even a small theater that may be available in a hotel (again, possibly at an additional cost). The various neighbor stations could indeed transmit the video feed portion directly to the monitor S1, bypassing the station PDA1, and the sound data feed could be fed through some other resource, possibly for use on an independent system that may be available.

If licenses are required for access to the encrypted data, the smart cards provided in the ODMA units comprising each station become relevant. The "keys" to the encrypted data can be obtained from a suitable source, such as a centralized authority, and passed on to the stations requiring the key to perform a function. Based on the subscription of the requesting user with the authority, the key could be made available and the costs charged to an account using the general method disclosed in International patent application no. WO98/

35474 entitled Secure Packet Radio Network. Therefore, encrypted data could be distributed to the various stations so all that the requesting unit requires is the key. Additional security is afforded to data providers as the full data stream is stored and routed through in multiple locations, so in this manner unauthorized access to the data is more difficult to achieve.

An important feature that arises from the described ODMA resource sharing and distributing process is a "neighborhood watch" mechanism that is enabled by virtue of the ODMA slow probing process. Each "neighborhood" or group of neighbors generated by the stations accumulates and retains a substantial collective and distributed knowledge. This knowledge can be accessed and assessed if necessary, especially where unusual or unwanted activities occur. In certain circumstances, these activities may be policed or monitored by the network and if necessary other stations can be alerted.

For example, if a station notices that certain content is being moved through a neighbor station without a security decryption key, or if the keys were not functional for some reason, the station could take some predetermined action, such as stopping the transmission and/or reporting the activity to an authority. Alternatively, as a security measure, a station could report back to an authority every time (or occasionally) that a neighbor, or the station itself, has transmitted certain data, thereby enabling the authority to confirm that the receiver has not circumvented the need for the key.

It should be recognized that the distribution of resources, however, does not mean that the resources with the greatest functionality are over utilized, as all the components of the available resources are taken into account. In an airplane, for example, one user may have a laptop computer with a certain movie available on its hard drive or in memory. Other units could enquire about available movies amongst the neighbors and be advised of the ready accessibility of this particular movie. If the laptop then had to spoon-feed the information to all the requesting stations it would very quickly run out of battery power. So portions of the data could be distributed around to other stations (for example, memory resources may be available on PDAs, other laptops, game consoles etc) so that all of these stations can subsequently feed the information to the requesting station(s). In this way, the battery resources of the laptop are not over utilized by virtue of the distribution.

In order to prevent undue reliance on certain specific neighboring stations, it is preferable to have data distributed to a greater extent than is strictly necessary. This built-in redundancy, or duplication, is especially relevant in the immediate neighborhood of the requesting station and in respect of the timing of data required to be transmitted by neighboring stations immediately following a request for data. Consequently, redundancy is directly proportional to, or at least is a function of, the proximity in space and time of the stations and data on which the requesting station is most reliant.

Redundancy and duplication are also of relevance given the mobile and essentially randomized nature of the dynamic network in a wireless environment. Not only might neighbors that are about to transmit information be switched off, lose power, lose connectivity or fail in some other manner, but they may also be moving around relative to one another. This may mean that new neighbors may be more efficiently and opportunistically suited to providing the information than was the case originally when the request was made. Having choices available to source the data means the data source may be chosen opportunistically from the known sources and on a packet by packet basis depending on the network connectivity conditions prevailing at the exact moment of transmission, as well as intelligent preferences being determined based on the cumulative "costs" associated with the location of the data.

Distributing the requested information, or part(s) thereof, to additional stations ensures that the network functions as optimally as possible. Having the information available at more than one location provides alternative transmission opportunities so that fluctuations in immediate connectivity are less relevant. The amount of redundancy required increases nearer to the actively transmitting station, but the amount of data concerned can be smaller as only the portions of data needing to be fed next or soon are relevant and potentially critical if connectivity is compromised. If the bulk of information is far away there will still be many routes to gain access to the resource so this is less problematic.

However, there is additional functionality in the network structure that enables intelligent choices to be made in allocating redundancy. In the ordinary course, stations have knowledge of the capabilities of their own neighbors and of their neighbors' neighbors, etc. Consequently, intelligent decisions can be made with reference to this information, such as memory/storage, processing power, connectivity quality, etc. Moreover, as is described in International patent application no. PCT/IB2006/002516 entitled Position Determination of Mobile Stations in a Wireless Network, filed 13 Sep. 2006, the content of which is incorporated herein by reference, it may be possible to determine the direction and speed of travel of the unit requiring the information. In addition, if there is information relating to the actual geographic topography of a region, it will be possible to make certain intelligent assumptions about the likely choices that will be made by the requesting station in the future. Of course, it is also possible that the requestor will itself communicate its intended route to assist this process and improve the service quality.

To illustrate the concept, passengers watching a movie in a vehicle traveling on a road may require additional data to be made available. Given that the vehicle's future position can be predicted from the known position, speed and direction of travel, and given that the vehicle is likely to remain on the road, the subsequent packets of data required might be gathered and transmitted to stations known to have good connectivity in regions positioned ahead or alongside the likely physical, geographic routing of the requesting station, in anticipation of the future needs of the station. When required, the stations with redundancy that have been identified will be capable of transmitting the information to the destination station through optimal ODMA routing.

Figure 2A:
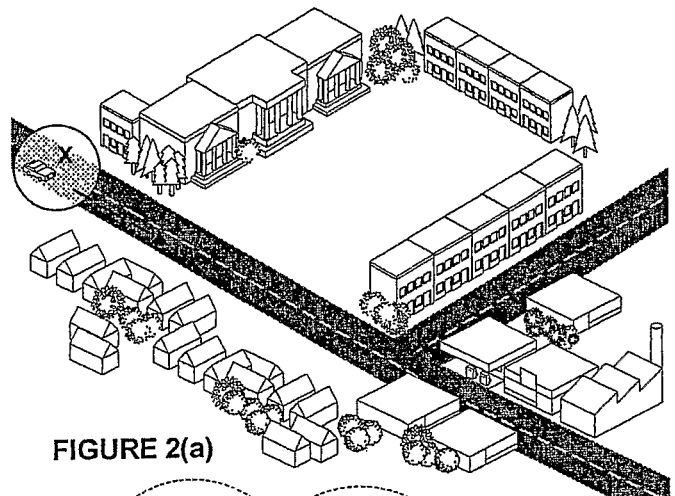
FIGS. 2(a) to (c) show connectivity diagrams similar to that of FIG. 1, in a geographic context.
Figure 2B:
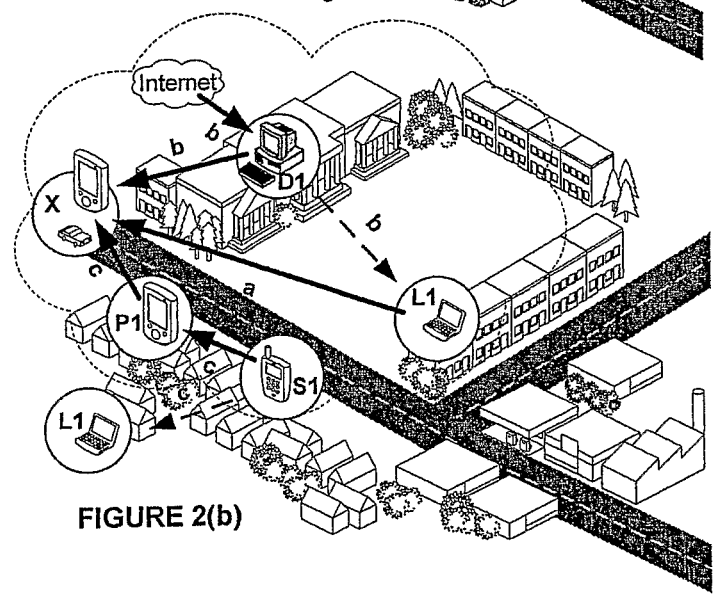

This concept is illustrated in FIG. 2, in which a vehicle X is traveling through a town as depicted in FIG. 2(a). In FIG. 2(b), a passenger in the vehicle is shown to be using a mobile station comprising a PDA device. Content is sourced through the resources in the station's "cloud" of neighbors (access to the specific neighbors and distributed resource functionality is not represented in the drawings of FIG. 2). Data is provided opportunistically by the best neighbor stations in portions, namely portion (a) is received from a laptop computer (L1), portion (c) is received from a PDA (P1, which had itself sourced the data from one of its neighbors (a smart phone (S1)) and portion (b) is received from a desktop computer (D1) having access to the Internet.

The stations S1 and D1 may also have provided for redundancy, as illustrated to L2 and L1 respectively, by sending certain of the data to other neighbor stations in good connectivity or likely to be in good connectivity with station X. The neighbor station (D1) is also able to source anticipated subsequent portions of the data, but the mobile station X in the vehicle has insufficient buffering resources to accept all of this data until it is actually required. Consequently, as the station D1 is aware that it has certain powerful neighboring stations with adequate resources in the region in which the station X is likely to travel, the subsequent data portions (d and e) are transmitted for temporary storage to a suitable neighbor (laptop computer L1).

Figure 2C:
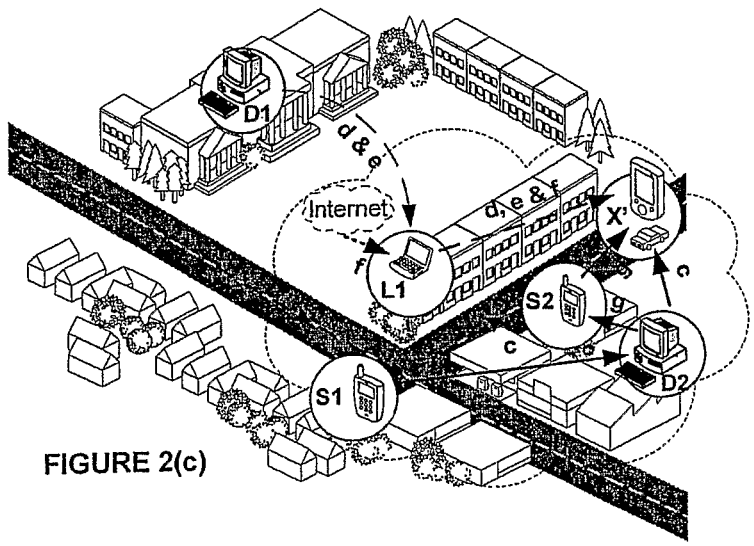

In FIG. 2(c), the mobile station in the vehicle has moved to a new position (X') and the user of the smart phone S1 has also moved on prior to providing all of the content in portion (c). As the vehicle is moving away, the station S1 transmits the data to a better suited neighbor station (D2), which continues to spoon-feed the remaining data to the station X in the vehicle. In the meantime the station L1 has possibly located a subsequent portion (f), and spoon-feeds the data (d), (e) and (f) when required, and through other stations as necessary.

Dispatching all the information to stations near the requester frees the source of the data to concentrate on its own next task instead of having to be involved for the requestor's entire data receiving experience. From FIG. 2, it can be seen that portion (g) is already available at D2, and this is transmitted via S2 which is best placed to spoon-feed when the need arises. It should also be clear from FIG. 2 that a changing "cloud" of resources is "dragged along" with the station X as it moves, with the neighbors all assisting in providing the data to the station in an intelligent fashion.

It will also be appreciated that were a new station in the region to request all or part of the same data, many of the assisting stations referred to in the example will already have much of the data available for ready distribution. This would be typical with data such as weather, sports, traffic and news download situations, for example, where many users are likely to have an interest in and be accessing the same topical, current events. Consequently, there should be many available choices to access the data or parts thereof locally, rendering the access to other sources, such as the Internet, increasingly less necessary and minimizing usage of network resources.

The nature of the neighbor gathering process may lead to beneficial solutions that are most relevant to the users requiring the information. For example, if a user travels to a new town, or even a new country, the user may require information about what is most readily available in the new place, rather than at the original location. For example, dynamic information such as the local news and traffic information in the specific area may be more of a priority than what is happening at home. It is likely that much of this information will be accessible from the neighbors gathered.

FIG. 3 shows such a situation. In FIG. 3(a) a vehicle at location X is traveling towards a city at Y. En route there are several residential areas (R1, R2 and R3), and commercial and industrial areas (C1 and F1). There are also numerous other vehicles on the roads and a train (T1). An ODMA station in the vehicle at X will have been gathering neighbors on an ongoing basis. In FIG. 3(b) it can be seen that the vehicle at X has a "cloud" Z1 of close neighbors around it within a single hop that it drags along with it as it moves. The cloud is of course simplistic, as in reality propagation characteristics may well mean that certain neighbors may be in good wireless connectivity despite being located relatively far away geographically. In FIG. 3(b), amongst the neighbors are several units located in houses in the residential area R1, in vehicles and possibly carried by numerous pedestrians and other individuals. It can be seen that at least one of the houses provides access to the Internet or to other networks.

Figure 3A:
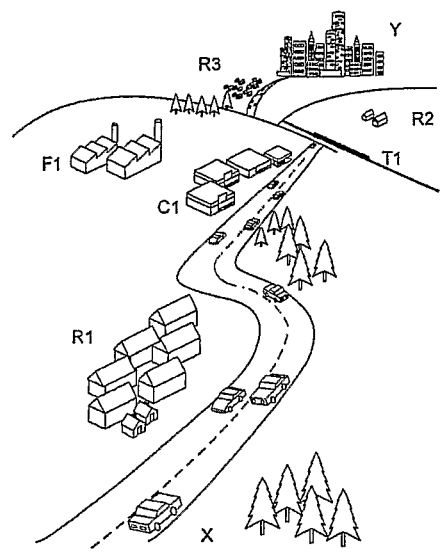
FIGS. 3(a) to (d) show simplified geographic representations of the potential for access to distributed resources available to users of the network of the invention.
Figure 3B:
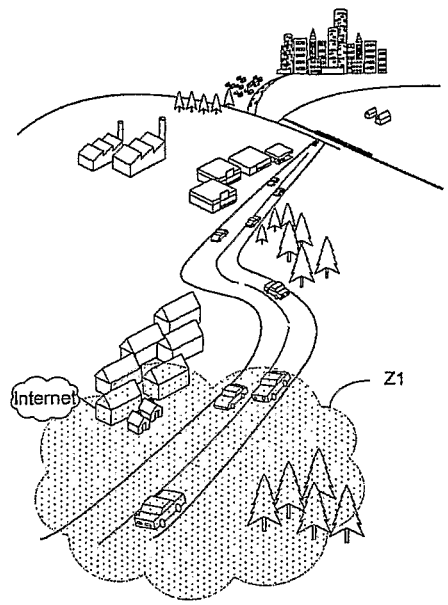
Figure 3C:
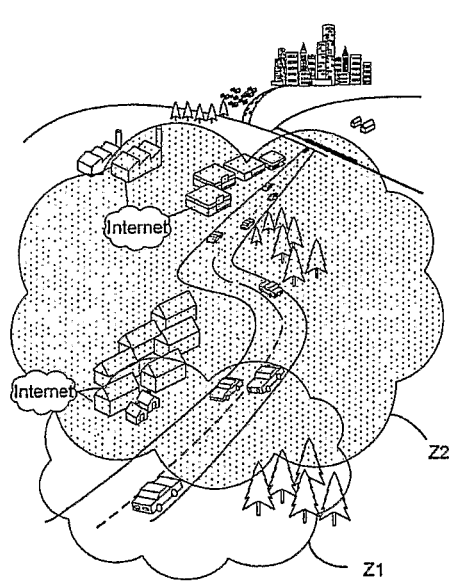

FIG. 3(c) simplistically illustrates that the neighbors of the neighbors of vehicle at position X, defining a second cloud Z2, extend the cloud of resources available considerably. (The drawing ignores the cloud that may be available outside of the area depicted in the drawing—for example neighbors of X may be further away from the city, as will be depicted in similar fashion in FIG. 3(d)). The consequence of this is that the vehicle at X has readily accessible knowledge of the commercial and industrial areas (C1 and F1) as well as access to information from passengers on the train (T1)—as well as additional opportunities of access to the Internet etc. If the station at X were to request information such as directions, availability of fuel for the vehicle, the nature of shopping and restaurants available, etc, there is a strong probability that the station in the vehicle need look no further than the information already available within the neighbors already gathered.

Additionally, if the vehicle at X required information regarding the city at Y, many of these neighbors would have neighbors with this information. Indeed, all relevant forms of certain information could be loaded automatically, such as the local "yellow pages" informational resources from which the user would be able to browse. Alternatively, information might only be provided at the request of the user, or when certain forms of information are accessed (for example, when a particular restaurant is queried a general guide might also be made available).

If the vehicle at X had a predetermined user profile, the neighbors would be aware of the information that may be of special relevance to the vehicle user. For example, the profile may state that the destination is the city at Y, or that fuel is low, in which case these forms of information may be prioritized to the vehicle at X. If the profile included information that the user enjoyed golf, fine food and the outdoors, for example, information could be offered relating to accommodation offerings in the residential area R3 (close to the city and having golfing facilities) which additionally provides easy access to restaurants in the city. In this manner, more relevant information could be transmitted to the user and indeed certain information may be petitioned to the user. There may be a particularly well known golf club, golf shop or golf factory on the way which may be of interest to the user, and the user could be prompted, to inform the user of the availability of this form of information. The profile could also specify whether such petitions are unwelcome or are to be blocked.

If desired, the station might be given, or might request, additional information that might assist in the decision. For example, real-time pictures or video feeds could be provided of the golf course or of a restaurant in the area, or of particular routes available, so that the user can assess whether they like the choices presented and whether they are crowded etc.

Moreover, if the user in the vehicle at X was busy requesting information, the other stations could recognize what the user is attempting to do and could suggest alternative resources that may be available. For example, enhanced processing power or larger screens might be available that would improve the quality of the experience or hasten the process.

Figure 3D:
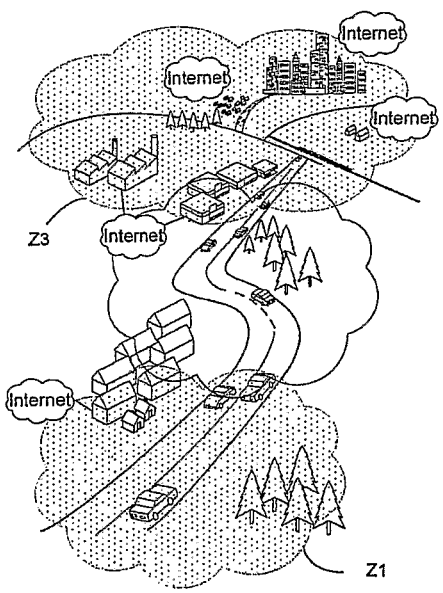

As the vehicle progresses closer to the city, the needs of the user may change as well as the information and resources available. FIG. 3(d) shows the expanded neighbor gathering clouds ahead (Z3) and behind the vehicle as it moves toward the city. Although there will be many more access points available to the Internet as well as increased routing opportunities, the quantity and quality of information accessible close by will multiply as the density of units increases.

For example, in a traffic blockage situation near the residential area R3, there will be a very high density of user stations in the specific region of the traffic jam and by virtue of the closely packed residences. Moreover, it is probable that most of these stations would appreciate and request access to very similar information—the nature and cause of the blockage. If some of the units have camera functionality, fixed or video images might be distributed and available to the network for access, thereby providing improved levels of quality information to other users. If users in vehicles have an enhanced understanding of the problem ahead, and if this information is shared, collectively the vehicle drivers might be able to make choices that would alleviate the problem. Given that this information is so relevant to so many stations, it is very likely that the information will be available to a given station within very few, short hops—which minimizes the activity of the network as a whole and reduces contributed interference.

Furthermore, given the ability of the ODMA network to locate the physical position of stations, including their speed and direction of travel, relevant specific information about such problems or alternatives could be communicated in advance. While the information may be irrelevant or highly relevant, the point is that the more information that is available, the more opportunities that are created to address the situation efficiently.

As briefly stated above, the other benefits that are provided in such a traffic jam situation are the additional resources available at very low transmission "cost" in terms of signal strength and data throughput. For example, passengers might be able to access video in the form of movies or news, or download games and the like from neighbors situated in the immediate or near vicinity. The manner in which this information is acquired or constrained, such as the pricing implications of gaining access or certain regional restrictions, may be controlled and managed by an authentication and directory server. However, the efficiencies afforded through the network are optimized by taking available information from that which is already distributed amongst those neighbors close by and with good connectivity.

It should also be remembered that access to information through centralized databases is not prohibited as such, and will obviously be made use of and accessed when needed. However, the important distinguishing feature is that at least some of the information may well be more efficiently accessed from within the network itself. If a user desires access to information or data that is less accessible, this can certainly be located through more conventional databases in centralized locations or at specific Internet addresses. For example, the information may be inaccessible wirelessly amongst the users in the connectivity region, but it may be possible to go over wire as is described in U.S. patent application No. 60/681,927 entitled Multi-Medium Wide Area Communication Network (referenced above). However, the need to obtain access to these other sources could require that an additional financial or other cost is associated with the acquisition of the information as this becomes a resource management consideration.

Although the applications disclosed above relate primarily to video streaming, any data may be accessed in this manner and retrieved by a requesting station. For example, an alternative embodiment may include access to the text and content of books and other written material. Desktop search engines presently available are capable of very quickly determining what is accessible at each user station, and there is no reason why such information cannot be shared upon request. This obviates the need to search for content at specific websites as the information is likely to be available on the units of the network users themselves.

Consequently, the ability to obtain fixed information and data most efficiently is maximized in the ODMA network, as well as the potential for receiving relevant local information and in attracting relevant location based services. The world itself is opportunistic and dynamic, where access to information and the information itself that is available changes dynamically, with the implication that the relevance of the information changes as users move and as time passes. The present invention optimizes the ability and capacity of users to take advantage of the opportunities as and when they are made available.

If a record of the nature of any information or data (or other resource) requested and accessed is maintained, even if only for a cycled but limited duration, this information relating to the request could be stored centrally at an authentication and distribution server. This facility would enable other stations to enquire from the central facility where best to get initial information about the potential availability of certain information and where data might be located. Providing an indication of where best to start looking could lead to the investigation being initiated as efficiently as possible and this assistance can ensure that information is pushed and pulled appropriately. The authentication servers will also authenticate the stations utilized in the process to ensure that sufficient security is in place to prevent unauthorized access to user facilities.

It should be appreciated that high or extreme levels of functionality and processing power are not always required. For example, if the information requested is required in real time (the user is watching a movie, or reading a book), there is (in computer processing terms) an enormous amount of time available to seek the information that will subsequently be required by the requesting station.

This means that many more stations on the network provide opportunities for efficient access to this type of information without significantly impacting the aggregate network resources. The import of this is that the units with greater functionality and resources are freed up to assist with the data retrieval of requests of users requiring higher resource levels and functionality. Indeed, in most instances, the need for search engines utilizing content provided at Internet based websites becomes less important, as many client station units on the network may well have much of this information in memory or cache.

From the above, it should become apparent that, aside from the actual data requested, the key functional resources that are utilizable in the methodology of the invention process are connectivity, memory/storage, computational processing power, display capability, location, and request and resource and maintenance (a record of what is being undertaken by neighboring stations and what is being requested or required, etc). These resources are potentially opportunistically available to the neighborhoods and consequently information relating to these resources can be gathered and maintained by the stations on an ongoing basis.

Recognition of this feature is especially significant, and liberates users by enabling units having little capacity or functionality to be of considerable benefit to the user accessing information. In principle, there is nothing preventing access to a user's home computer (or any other station or any other source of information) using little more than a very simple station with limited resources and functionality. For example, the user could carry a key ring type of unit, containing little more that an ODMA smart card. The unit may have negligible memory and processing power, and indeed limited or no display facility at all, but by gathering information about the ODMA neighborhood, suitable neighbors could provide all of these resources. Accordingly, an unused ODMA station screen may be available in a taxi or in an electronics store or in an office; and information could be processed and fed to the identified screen from suitable neighbors as the data is accessed from the home computer or other stations on the network.

Additionally, a subscriber's own equipment may be used efficiently in order to provide the greatest flexibility. For example, a user might leave her laptop computer in her vehicle when dining at a restaurant, but could use her PDA to look for suitable accommodation, or initiate and have access to some more sophisticated functionality remotely. Any relevant information could be transmitted by the network (or may have already been transmitted) to the laptop, as it has enhanced memory and processing functionality, and this could then be accessed by the PDA. Alternatively, the reverse could be true, the user using her camera on the PDA to take pictures and automatically storing these on the laptop or to other computers, such as those of friends, business colleagues, etc. This not only prevents loss of the information in the event that the camera is lost or damaged, but provides access to greater memory resources and thereby enables more pictures to be taken at a higher resolution. This ongoing backup process to a remote memory/storage database, or even if it is merely distributed around the network, provides an archiving capability that is in itself useful in certain situations.

For example, if a surveillance camera linked to a network station was deliberately destroyed by a wrongdoer, who was concerned that an event had been filmed, the information should already have been distributed elsewhere. Buffers of memory available around the neighbor stations can be prioritized to enable the lost memory in the damaged camera to be restored from the network. By way of illustration, a surveillance camera may have limited buffer capacity. However, if an alarm or other trigger is activated the pictures captured by particular cameras around the incident may be considered more relevant than others. Consequently, the buffering needs of other cameras or other neighbor units may be suppressed in favor of the camera(s) that has priority so that the most important information is recorded and not potentially lost. In addition, the event could trigger other cameras, monitoring and recording devices and other resources in the area to distribute their buffered information before and after the event so that it can not be lost. Certain devices could be instructed to focus on the event (the cameras turn, for example, towards the event, or to regions near, in front of or behind the event, to provide additional information of the circumstances before and after the incident).

As another example, a police car in hot pursuit of a vehicle may require images of enhanced resolution that exceed the memory storage capabilities in the vehicle. Therefore, this information will be dumped into other available resources, which supplement the local data storage available, and ensures that the data is not lost in the event that the police vehicle is destroyed in an ensuing accident during the pursuit. The police cars could trigger other cameras and monitoring/recording devices to be activated based on information or position (anticipating locations ahead of the chase and behind or around the fleeing vehicle, so that the pursuing police car can anticipate blockages and potential areas to trap or slow the fugitive).

The requests for stations to assist can be determined according to the perceived needs, based on defined criteria. If a monitoring or recording device or camera detects that a vehicle has stopped on a main road, for example, this could be reported and monitored as it may indicate an upstream or downstream problem at an early stage. At this point, police or other authorities could even contact subscriber stations and request that the user assist in displaying images etc.

Certain surveillance equipment can be provided for many specific reasons, and could be deployed on roads, high security sites (banks for example) or high risk areas (landmarks, key sites etc). The reasons and trigger devices may include applications for controlling dangerous or high impact circumstances such as for crime and terrorism control, natural disasters (sea levels changes, floods, fires, earth movements etc), as well as the more mundane aspects of traffic control and people movement etc. The determination of necessary responses, the sharing of relevant information, the provision, integration, management and monitoring of emergency services, or other suitable personnel, can be greatly assisted in this manner and also utilized in any hierarchical control.

Obviously, access to the data can be protected through encryption and station authentication techniques controlled through smartcards or other suitable network management devices. However, it should be appreciated that the available memory and processing power that is available at any given moment amongst neighbors to a certain level of hops is surprisingly large and should not be underestimated. Aside from the more obvious computer and database server resources available, many modern electronic devices that are available commercially provide substantial resources that can be utilized efficiently.

For example, even unsophisticated digital cameras or games presently have memory cards providing well in excess of 1 Gigabyte of memory. Assuming that any mainstream movie requires approximately 1 GB of memory (at reduced resolution suitable for portable devices), if half of the population of Manhattan alone (1.5 million people) had such a digital camera, there could theoretically be sufficient memory to store 750,000 full length movies. This is probably more than the number of films actually available and certainly well in excess of the choices available through a regular rental facility or other centralized source. The example serves to illustrate that facilities are available in a network that are substantial in aggregate, even without accounting for any other mainstream storage available on other traditional devices, such as personal computers and servers, etc, which are clearly considerably more extensive.

It must be appreciated that the redistribution and allocation of resources amongst the network stations is ultimately aimed at optimizing opportunities that are available. The network is able to detect the dynamic shifting in the resources available, as well as the space and time characteristics, and exploit the opportunities to the maximum advantage available at any given moment. To achieve this objective, users can be compensated with incentives, such as reward points or money, in order to encourage them to make their units available to the network when not required by the user as such.

Moreover, the invention further contemplates that there is also the possibility that certain ODMA units will advertise their suitability as a resource for certain purposes in exchange for certain benefits from the network. Units may deliberately provide memory storage facilities for buffering, or processor capacity for calculations, etc. Users may be directed to these stations by virtue of their profile and position. Certain users could benefit from the intentional provision of access to resources, by parking a car having a station with considerable memory, processing power and large antennas in a suitable location, for example. Such stations would provide all the connectivity, computer resources and data throughputs required, and receive compensation for doing so.

In addition, stations requesting information might advertise the nature of certain data that is important at some centralized location, such as at the authentication and distribution server. Other stations that check this server will become aware of the need for this information and can subsequently then feed the information through should they subsequently locate it. Alternatively, a station might petition other stations for the right to use the resources, which could be provided at a price. The bidding process could be undertaken by the station, or by the authentication server of the network on the user station's behalf.

The general concept is that the overall resources of the entire network are shared as efficiently as possible, utilizing the most suitable resources available and leading to the greatest possible saving of power required in transmissions; which in turn lengthens battery lives, uses less power in general and is ultimately beneficial to the environment (using less natural resources and requiring a reduced need of disposal of toxic substances such as those used in batteries).

Ultimately, at least in theory, there will eventually be little or no need for centralized servers—as all information available will be distributed across the network units. If stations are available to 10 hops, there will be little need for excessive duplication, as some units may be very reliable and require less redundancy. However, where more distant communications are required then by definition these become increasingly unreliable, so more opportunities must be created through distribution of resources to remain efficient. In such circumstances, for example, a message could be split up deliberately from the outset, so that it is sent through a number of different routes, or the message could be deliberately duplicated, with a facility to communicate to the stations on the other transmission when the pieces of the message have been received at the destination. The impact of this is to essentially utilize independent processing available on the network and avoid dropped or repeated messages.

The ODMA network also provides a convenient and highly efficient means of disseminating large amounts of information. Conventional communication systems would transmit the same message to all the users of the network as a complete message from the originating station to each of the destination—in other words using all the resources required to transmit the message between the origin and destination for every station. The ODMA network allows the information to be sent out on a shared resource basis, with the one message broken into many smaller pieces at the originating station and distributed into the network. Ultimately all the neighbors will be able to determine where all the pieces can be found and these can be shared around.

For example, a public release of a new film could be made available to paying subscribers by fragmenting the film into smaller portions, shuffling out the pieces so that it may be disseminated to users in a "controlled flood." Each packet can be sent on to each station's five close neighbors, who may distribute it to their five close neighbors, etc. This form of distribution will be simpler and more efficient than transmitting the message many times as a single copy and is a very effective way of sending information to many users. Of course, if it is anticipated that many users are likely to request that they obtain access to the same data (in other words the data is popular and accessed often) then the data portions can be maintained over a longer period and can be held in more places (increased redundancy).

In essence, distilled at the heart of the invention, is the concept that neighbors are gathered at each station and in so doing each station is provided with collaborative assistance, monitoring and support from the neighbors. All the stations that are being "dragged around" as "clouds of resources" are all available to look after each other, including far off neighbors that may be collected over other media such as the Internet.

The invention claimed is:

1. A method of operating a network comprising a plurality of stations each able to transmit and receive data so that the network can transmit data directly, or indirectly via one or more intermediate stations, between a requesting station and potential resource providing stations, the method comprising:
   monitoring, at each station, the activity and/or resources of other stations on the network to establish the availability of resources at the other stations;
   transmitting, from a requesting station requiring a specified resource, slow "neighbour gathering" probe signals at regular intervals (determined by a Slow Probe Timer) to find other stations varying the probe power until a certain predetermined number of stations indicate they are able to detect the probes if a station never acquires the required number of neighbors it will remain at the lowest data rate and maximum transmit power resource request probe signals identifying the specified resource;
   further transmitting fast probe signals (or gradient gathering probe signals) to develop information on how to reach that station if a station has a message (or other data) to transmit to a station that is not one of its neighbors until the destination station hears the fast probes of its neighbors;
   determining, at each station receiving the resource request probe signals, the availability at said station of the specified resource or a portion thereof and hence whether said station is a potential resource providing station;
   transmitting, from a potential resource providing station having the specified resource or a portion thereof, response data directly, or indirectly via one or more intermediate stations, to the requesting station indicating the availability of the specified resource or portion thereof to the requesting station; and
   receiving, at the requesting station, access to the specified resource or portion thereof from at least one resource providing station selected from one or more potential resource providing stations.

2. The method according to claim 1 wherein the specified resource is one or more of data, connectivity within the network or to an external network or device, memory/storage, data processing capability, display capability, and data relating to the maintenance of information on the location of stations, the history of resource requests and fulfillment of such requests, and the availability of resources.

3. The method according to claim 2 wherein said data is one or more of video, audio, text, image or other data.

4. The method according to claim 1 wherein stations in the network receive the resource request probe signals directly from the requesting station.

5. The method according to claim 1 wherein stations in the network receive the resource request probe signals indirectly via one or more intermediate stations.

6. The method according to claim 5 wherein each station receiving the resource request probe signals monitors the number of transmission hops via intermediate stations between the requesting station and itself and responds only to probe signals received via fewer than a predetermined number of intermediate stations or transmission hops, or if the cumulative cost of transmission to the requesting station is less than a predetermined value.

7. The method according to claim 5 wherein, where the resource request probe signals and response data are transmitted via one or more intermediate stations, each transmission is made opportunistically based on one or more criteria.

8. The method according to claim 7 wherein, the stations of the network monitor the cumulative power required to reach another station, thereby defining a cost gradient to the other stations, with stations using the cost gradient in the selection criteria used to determine an optimal route through the network between a resource providing station and a requesting station.

9. The A method according to claim 7 wherein the criteria include the cost of each hop between stations, or the cumulative cost of message transmission between stations having connectivity with one another, directly or via intermediate stations.

10. The method according to claim 1 wherein the specified resource is obtained from one or more resource providing stations, which resource providing stations are selected according to one or more criteria, including the extent of the specified resource available at the resource providing station, the data processing capacity of the resource providing station, the data storage capacity of the resource providing station, the distance or number of hops via intermediate stations between the resource providing station and the requesting station, the quality of communication between immediate stations and/or the cumulative connectivity cost between the resource providing station and the requesting station, availability of power at the resource providing station and/or intermediate stations, the existence of other demands on the resource providing station, and the amount of time available within which the specified resource can be supplied timeously to the requesting station.

11. The method according to claim 1 wherein the choice of resource providing station made opportunistically at the moment of distribution of the specified resource.

12. The method according to claim 1 wherein plurality of stations cooperate actively in making the specified resource available to the requesting station.

13. The method according to claim 1 wherein the specified resource or portion thereof is transferred between one or more resource providing stations and one or more intermediate stations, with the intermediate stations taking over the role of the initial resource providing stations, as the requesting station moves relative to the other stations.

14. The method according to claim 13 wherein the source or intermediate stations predict the route of a requesting station that is moving and steer the specified resource to further intermediate stations expected to be located opportunely to make the resource available to the requesting station.

15. The method according to claim 14 wherein multiple sources of the specified resource are utilized and/or buffered for piecemeal distribution to the resource providing station.

16. The method according to claim 13 wherein the specified resource is actively distributed from one or more resource providing stations to further stations capable of acting as intermediate or resource providing stations, to provide redundancy in the event of a loss or reduced quality of connectivity between stations, or a loss or reduction of quality of resources or functionality at stations, or other events likely to limit availability of the specified resource to the requesting station.

17. The method according to claim 12 wherein, where several requesting stations request substantially the same data from one or more potential resource providing stations at substantially the same time, a resource providing station transmits the data to one or more of the requesting stations, together with an additional request that said one or more requesting stations and/or intermediate stations forward the data to other requesting stations that have good connectivity with the initial requesting station and/or intermediate stations, thereby enabling said other requesting stations to source data from stations that are substantially in the same locale.

18. The method according to claim 1 wherein stations in the network advertise their availability as potential resource providing stations to other stations in the network, and transmit probe signals to other stations including data indicating the nature and extent of the resources available.

19. The method according to claim 18 wherein stations receiving such probe signals from potential resource providing stations determine the desirability of the advertised resources based on the probe signals and data received therefrom, and request part or all of the resource available.

20. The method according to claim 1 wherein profile and location information are maintained at neighbor stations indicating potential interest in at least a portion of the resources being advertised to potential requesting stations.

21. The method according to claim 1 wherein stations in the network monitor network transmissions for irregularities indicating undesirable activity, and transmit notice of such activity to other stations and/or to a central authority.

22. The method according to claim 1 including transmitting a plurality of different data blocks to a plurality of stations from a resource providing station, the data blocks together comprising a complete data set, and a requesting station requiring the complete data set obtaining the data blocks from one or more resource providing stations.

23. The method according to claim 1 wherein the requesting station initially selects a resource providing station able to supply a relatively poor quality resource, and subsequently selects one or more alternative resource providing stations able to continue supplying the resource at a higher quality level.

24. The method according to claim 1 including maintaining a record of resources requested and/or accessed at a central server, requesting stations being able to access the record to obtain initial information about the availability and/or location of such resources.

25. The method according to claim 1 to wherein stations in the network monitor transmissions of other stations to detect transmissions requiring a decryption key or having predetermined content, a station detecting such a transmission declining to transmit said transmission onward or notifying a central authority if it fails to meet one or more predetermined criteria.

26. The method according to claim 1 wherein at least one station in the network has a monitoring or surveillance function, said at least one station generating, in response to an alarm condition, a request to other stations to prioritize the capture, transmission and/or storage of data relating to an event associated with the alarm condition.

27. The method according to claim 26 wherein the other stations respond to the request by storing data relating to the alarm condition, including data captured before and/or after the occurrence of the alarm condition.

28. A communication network comprising a plurality of stations each able to transmit and receive data so that the network can transmit data directly, or indirectly via one or more intermediate stations, between a requesting station and potential resource providing stations, each station being arranged to:
monitor the activity of other stations on the network to establish the availability of intermediate stations for onward transmission of data between the requesting station and the potential resource providing stations;
transmit from a requesting station requiring a specified resource, slow "neighbour gathering" probe signals at regular intervals (determined by a Slow Probe Timer) to find other stations varying the probe power until a certain predetermined number of stations indicate they are able to detect the probes if a station never acquires the required number it will remain at the lowest data rate and maximum transmit power resource request probe signals identifying the specified resource;

further transmit fast probe signals (or gradient gathering probe signals) to develop information on how to reach that station if a station has a message (or other data) to transmit to a station that is not one of its neighbors until the destination station hears the fast probes of its neighbors;

determine, when acting as a station receiving the resource request probe signals, the availability at said station of the specified resource or a portion thereof and hence whether said station is a potential resource providing station;

transmit, when determined to be a potential resource providing station having the specified resource or a portion thereof, response data directly, or indirectly via one or more intermediate stations, to the requesting station indicating the availability of the specified resource or portion thereof to the requesting station; and receive, when acting as the requesting station, access to the specified resource or portion thereof from at least one resource providing station selected from one or more potential resource providing stations.

* * * * *